United States Patent
Spakowski et al.

(10) Patent No.: US 9,989,022 B2
(45) Date of Patent: Jun. 5, 2018

(54) FUEL SYSTEM FOR AN INTERNAL COMBUSTION ENGINE AND METHOD OF OPERATING

(71) Applicant: DELPHI TECHNOLOGIES IP LIMITED, St. Michael (BB)

(72) Inventors: Joseph G. Spakowski, Rochester, NY (US); Timothy D. Spegar, Honeoye Falls, NY (US)

(73) Assignee: DELPHI TECHNOLOGIES IP LIMITED (BB)

( * ) Notice: Subject to any disclaimer, the term of this patent is extended or adjusted under 35 U.S.C. 154(b) by 0 days. days.

(21) Appl. No.: 14/963,757

(22) Filed: Dec. 9, 2015

(65) Prior Publication Data

US 2017/0167450 A1    Jun. 15, 2017

(51) Int. Cl.
| | |
|---|---|
| F02M 31/20 | (2006.01) |
| F02M 37/04 | (2006.01) |
| F02M 37/08 | (2006.01) |
| F02M 55/02 | (2006.01) |
| F02M 63/02 | (2006.01) |
| F02M 37/00 | (2006.01) |

(52) U.S. Cl.
CPC ........ *F02M 31/20* (2013.01); *F02M 37/0047* (2013.01); *F02M 37/043* (2013.01); *F02M 37/08* (2013.01); *F02M 55/025* (2013.01); *F02M 63/0265* (2013.01); *F02M 63/0285* (2013.01)

(58) Field of Classification Search
CPC .......... F02M 37/0047; F02M 63/0285; F02M 63/0265
See application file for complete search history.

(56) References Cited

U.S. PATENT DOCUMENTS

| | | | | |
|---|---|---|---|---|
| 5,354,183 | A * | 10/1994 | Eisenbacher | ........... F04B 1/053 417/273 |
| 7,263,973 | B2 | 9/2007 | Akita et al. | |
| 8,727,752 | B2 | 5/2014 | Lucas | |
| 8,973,556 | B2 | 3/2015 | Hoefner et al. | |
| 9,145,860 | B2 * | 9/2015 | Usui | ..................... F02M 59/462 |
| 2003/0108443 | A1 * | 6/2003 | Suzuki | ................. F02M 59/102 417/470 |
| 2004/0197216 | A1 * | 10/2004 | Kuroda | .................. F02M 53/00 417/470 |
| 2006/0169251 | A1 * | 8/2006 | Mori | ...................... F02M 37/22 123/446 |

(Continued)

*Primary Examiner* — Stephen K Cronin
*Assistant Examiner* — Kody Kight
(74) *Attorney, Agent, or Firm* — Joshua M. Haines

(57) ABSTRACT

A fuel system includes a low-pressure fuel delivery unit; a high-pressure fuel delivery unit which has a drive region and a delivery region such that the drive region supplies fuel to the delivery region and such that the delivery region supplies fuel to a high-pressure fuel injector; a low-pressure fuel supply passage which supplies fuel from the low-pressure fuel delivery unit to the drive region of the high-pressure fuel delivery unit; a cooling passage which receives fuel from the drive region of the high-pressure fuel delivery unit; and a low-pressure fuel injector supply passage which is in direct fluid communication with the low-pressure fuel supply passage and which supplies fuel to a low-pressure fuel injector from the cooling passage.

9 Claims, 1 Drawing Sheet

(56) References Cited

U.S. PATENT DOCUMENTS

| | | | | |
|---|---|---|---|---|
| 2008/0184969 A1* | 8/2008 | Schroeder | ............ | F02M 55/00 |
| | | | | 123/505 |
| 2009/0320796 A1* | 12/2009 | Kojima | ................ | F02M 55/04 |
| | | | | 123/447 |
| 2013/0118449 A1* | 5/2013 | Marriott | ................ | F02M 43/02 |
| | | | | 123/304 |
| 2016/0076475 A1* | 3/2016 | Suzuki | .............. | F02M 63/0225 |
| | | | | 123/445 |
| 2016/0169144 A1* | 6/2016 | Surnilla | ............ | F02D 41/3845 |
| | | | | 123/435 |
| 2016/0169145 A1* | 6/2016 | Surnilla | ............... | F02D 41/345 |
| | | | | 701/104 |
| 2016/0245218 A1* | 8/2016 | Ulrey | .................. | F02M 59/022 |
| 2016/0377017 A1* | 12/2016 | Basmaji | ............ | F02D 41/3845 |
| | | | | 701/103 |
| 2016/0377018 A1* | 12/2016 | Sanborn | ............ | F02M 63/0285 |
| | | | | 123/457 |

* cited by examiner

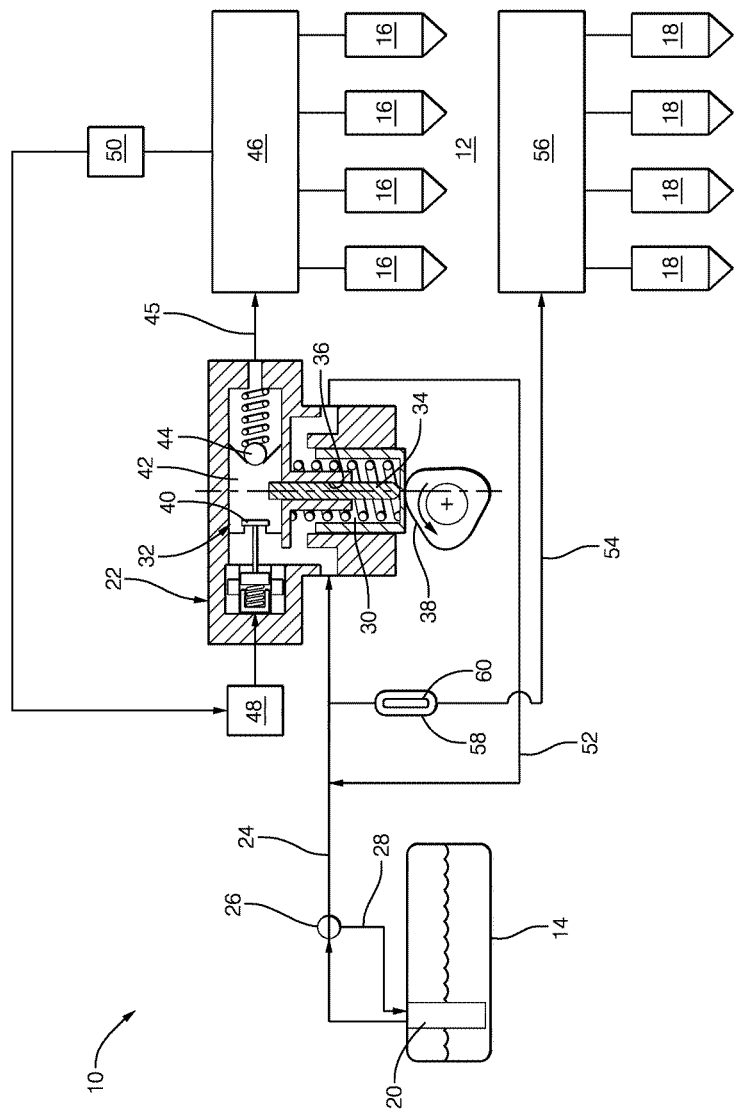

FUEL SYSTEM FOR AN INTERNAL COMBUSTION ENGINE AND METHOD OF OPERATING

TECHNICAL FIELD OF INVENTION

The present invention relates to a fuel system for an internal combustion engine; more particularly to a fuel system which includes a portion for delivering fuel directly to the combustion chamber of the internal combustion engine at a relatively high pressure and a portion for delivering fuel upstream of the combustion chamber at a relatively low pressure; and still even more particularly to a fuel system where a high-pressure fuel delivery unit is cooled and lubricated even when little or no fuel is delivered directly to the combustion chamber.

BACKGROUND OF INVENTION

Fuel systems for modern internal combustion engines typically employ either 1) port fuel injection (PFI) where fuel is injected into an air intake manifold of the internal combustion engine at relatively low pressure (typically below about 500 kPa) and subsequently passed to the combustion chamber of the internal combustion engine or 2) gasoline direct injection (GDi) where fuel is injected directly into the combustion chamber of the internal combustion engine at relatively high pressure (typically above about 14 MPa). However, some fuel systems have been developed which employ both PFI and GDi in order to take advantage of operating modes where PFI provides operational benefits and in order to take advantage of operating modes where GDi provides operational benefits. Consequently, only the PFI may be utilized under some operating conditions while only GDi may be utilized under other operating conditions. One example of a fuel system which employs both PFI and GDi is described in U.S. Pat. No. 7,263,973 to Akita et al.; however, a disadvantage of the system of Akita et al. is that when only the PFI system is used, the high-pressure fuel pump used to pressurize the fuel in the GDi system continues to be cycled by a camshaft of the internal combustion engine. This cycling, along with the close proximity of the high-pressure fuel pump to the internal combustion engine, causes fuel in the high-pressure fuel pump to elevate in temperature and potentially create vapor in the GDi system which is undesirable for the high-pressure fuel pump and which may hinder fueling when the GDi system is used.

U.S. Pat. No. 8,973,556 to Hoefner et al. describes another fuel system which employs both PFI and GDi. Hoefner et al. provides an arrangement where fuel that is used in both the PFI system and GDi system is first supplied to a drive section of the high-pressure fuel pump. Consequently, when only the PFI system is used, fuel flows through the drive section of the high-pressure fuel pump, thereby providing lubrication and cooling to the high-pressure fuel pump. While the arrangement Hoefner et al. may be effective, improvements and alternatives in any art are sought and may be desirable.

What is needed is a fuel system which minimizes or eliminates one or more of the shortcomings as set forth above and provides an alternative to the fuel systems as set forth above.

SUMMARY OF THE INVENTION

Briefly described, a fuel system for an internal combustion engine is provided which includes a low-pressure fuel delivery unit; a high-pressure fuel delivery unit which has a drive region and a delivery region such that the drive region supplies fuel to the delivery region and such that the delivery region supplies fuel to a high-pressure fuel injector; a low-pressure fuel supply passage which supplies fuel from the low-pressure fuel delivery unit to the drive region of the high-pressure fuel delivery unit; a cooling passage which receives fuel from the drive region of the high-pressure fuel delivery unit; and a low-pressure fuel injector supply passage which is in direct fluid communication with the low-pressure fuel supply passage and which supplies fuel to a low-pressure fuel injector from the cooling passage. The cooling passage ensures that a fresh supply of fuel circulates through the drive region even when the high-pressure fuel delivery unit is not being used to supply fuel to the high-pressure fuel injector, thereby providing lubrication and cooling to the high-pressure fuel delivery unit.

A method is also provided for operating a fuel system where the fuel system has a low-pressure fuel delivery unit, a high-pressure fuel delivery unit having a drive region and a delivery region such that the drive region supplies fuel to the delivery region and such that the delivery region supplies fuel to a high-pressure fuel injector, a low-pressure fuel supply passage, a cooling passage which receives fuel from the drive region of the high-pressure fuel delivery unit, and a low-pressure fuel injector supply passage in direct fluid communication with the low-pressure fuel supply passage. The method includes using the low-pressure fuel delivery unit to supply fuel to the drive region of the high-pressure fuel delivery unit through the low-pressure fuel supply passage; using the cooling passage to supply fuel from the drive region of the high-pressure fuel delivery unit to the low-pressure fuel injector supply passage; and using the low-pressure fuel injector supply passage to supply fuel to a low-pressure fuel injector from the cooling passage.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

This invention will be further described with reference to the accompanying drawings in which:

FIG. 1 is a schematic view of a fuel system in accordance with the present invention.

DETAILED DESCRIPTION OF INVENTION

In accordance with a preferred embodiment of this invention and referring to FIG. 1, a fuel system 10 for an internal combustion engine 12 is shown. Fuel system 10 generally includes a fuel tank 14 which holds a volume of fuel to be supplied to internal combustion engine 12 for operation thereof; a plurality of high-pressure fuel injectors 16 which inject fuel directly into respective combustion chambers (not shown) of internal combustion engine 12; a plurality of low-pressure fuel injectors 18 which inject fuel into an air intake manifold (not shown) of internal combustion engine 12 where the fuel mixes with air and is subsequently passed to the combustion chambers through respective intake valves (not shown); a low-pressure fuel delivery unit 20; and a high-pressure fuel delivery unit 22 where the low-pressure fuel delivery unit 20 draws fuel from fuel tank 14 and elevates the pressure of the fuel for delivery to high-pressure fuel delivery unit 22 and to low-pressure fuel injectors 18 and where the high-pressure fuel delivery unit 22 further elevates the pressure of the fuel for delivery to high-pressure fuel injectors 16. By way of non-limiting example only, low-pressure fuel delivery unit 20 may elevate the pressure of the fuel to about 500 kPa or less and high-pressure fuel delivery unit 22 may elevate the pressure of the fuel to above about 14 MPa. Depending on the operating conditions and desired performance, selection can be made to deliver fuel to the combustion chambers by high-pressure fuel injectors 16 or by low-pressure fuel injectors 18. It is also contemplated that fuel may be delivered to the combustion chambers by both high-pressure fuel injectors 16 and by low-pressure fuel injectors 18 concurrently. While four high-pressure fuel injectors 16 and four low-pressure fuel injectors 18 have been illustrated, it should be understood that a lesser or greater number of each of high-pressure fuel injectors 16 and low-pressure fuel injectors 18 may be provided. The various elements of fuel system 10 will be described in greater detail in the paragraphs that follow.

As shown, low-pressure fuel delivery unit 20 may be provided within fuel tank 14, however low-pressure fuel delivery unit 20 may alternatively be provided outside of fuel tank 14. Low-pressure fuel delivery unit 20 may be an electric fuel pump. A low-pressure fuel supply passage 24 provides fluid communication from low-pressure fuel delivery unit 20 to high-pressure fuel delivery unit 22. A fuel pressure regulator 26 may be provided such that fuel pressure regulator 26 maintains a substantially uniform pressure within low-pressure fuel supply passage 24 by returning a portion of the fuel supplied by low-pressure fuel delivery unit 20 to fuel tank 14 through a fuel return passage 28. While fuel pressure regulator 26 has been illustrated in low-pressure fuel supply passage 24 outside of fuel tank 14, it should be understood that fuel pressure regulator 26 may be located within fuel tank 14 and may be integrated with low-pressure fuel delivery unit 20.

High-pressure fuel delivery unit 22 includes a drive region 30 and a delivery region 32. High-pressure fuel delivery unit 22 may be a plunger pump which is mechanically driven by internal combustion engine 12 such that drive region 30 includes a pumping plunger 34 which is reciprocated within a plunger bore 36 by a rotating camshaft 38 of internal combustion engine 12. Delivery region 32 includes an inlet valve 40, a pumping chamber 42, and an outlet valve 44. The fuel within pumping chamber 42 is pressurized by reciprocation of pumping plunger 34, and when the pressure within pumping chamber 42 is sufficiently high, outlet valve 44 is caused to open. Fuel that exits high-pressure fuel delivery unit 22 through outlet valve 44 is communicated, via a high-pressure fuel passage 45, to a high-pressure fuel rail 46 with which each of high-pressure fuel injectors 16 are in fluid communication. Inlet valve 40 may be, by way of non-limiting example only, a solenoid operated valve which is controlled by a controller 48. Controller 48 may receive input from a pressure sensor 50 which supplies a signal indicative of the pressure of the fuel being supplied to high-pressure fuel injectors 16. While pressure sensor 50 is shown arranged to read the fuel pressure within high-pressure fuel rail 46, it should be understood that pressure sensor 50 may be positioned at other locations that are indicative of the pressure of the fuel being supplied to high-pressure fuel injectors 16. Controller 48 sends signals to inlet valve 40 to open and close inlet valve 40 as necessary to achieve a desired fuel pressure at pressure sensor 50 as may be determined by current and anticipated engine operating demands. When inlet valve 40 is opened while pumping plunger 34 is moving to increase the volume of pumping chamber 42, fuel from low-pressure fuel supply passage 24 is allowed to flow into pumping chamber 42. Low-pressure fuel supply passage 24 is also in fluid communication with drive region 30 such that a cooling passage 52 is provided which provides an outlet from drive region 30 and feeds fuel directly back to low-pressure fuel supply passage 24 at a location between low-pressure fuel delivery unit 20 and high-pressure fuel delivery unit 22. Cooling passage 52 ensures that fuel is able to circulate through drive region 30 when internal combustion engine 12 is operating using only low-pressure fuel injectors 18 or when only small amounts of fuel are being supplied to the combustion chambers of internal combustion engine 12 by high-pressure fuel injectors 16. Circulation of fuel through drive region 30 ensures proper lubrication of high-pressure fuel delivery unit 22 and also provides cooling to high-pressure fuel delivery unit 22.

A low-pressure fuel injector supply passage 54 is in direct fluid communication with, and receives fuel from low-pressure fuel supply passage 24 at a location between cooling passage 52 and high-pressure fuel delivery unit 22. Low-pressure fuel injector supply passage 54 communicates fuel to a low-pressure fuel rail 56 with which each of low-pressure fuel injectors 18 are in fluid communication. Since low-pressure fuel injector supply passage 54 receives fuel from low-pressure fuel supply passage 24 downstream of the location where cooling passage 52 feeds directly into low-pressure fuel supply passage 24, a portion of the fuel that passes to low-pressure fuel injectors 18 is fuel that previously passed through drive region 30. Consequently, a portion of the fuel that passes to drive region 30 is fresh, relatively cool fuel from fuel tank 14, thereby aiding in cooling high-pressure fuel delivery unit 22.

When internal combustion engine 12 operates only with fuel supplied by low-pressure fuel injectors 18, pumping plunger 34 continues to reciprocate. Reciprocation of pumping plunger 34 may produce pressure pulsations which may be carried through low-pressure fuel injector supply passage 54. If left unmitigated, these pressure pulsations may produce objectionable noise and may lead to variations in the quantity of fuel delivered by low-pressure fuel injectors 18. In order to minimize or eliminate these pressure pulsations, an accumulator 58 may be included in low-pressure fuel injector supply passage 54 which provides an enlarged volume within which pressure pulsations may naturally reflect and decrease in magnitude. A pulsation damper 60 may be located within accumulator 58 such that the pulsation damper 60 is flexible and resilient in nature in order to adsorb the pressure pulsations. Pulsation damper 60 may take the form of an imperforate hollow and flexible shell which is pressurized with a gas. The pressure pulsations cause the shell of pulsation damper 60 to flex inward and the pressurized gas returns the shell to its original shape, thereby mitigating the pressure pulsations. An example of a suitable pulsation damper is described in U.S. Pat. No. 8,727,752 to Lucas, the disclosure of which is hereby incorporated by reference in its entirety.

In operation, when only high-pressure fuel injectors 16 are used to supply fuel to the combustion chambers of internal combustion engine 12, low-pressure fuel delivery unit 20 draws fuel from fuel tank 14 and passes the fuel to high-pressure fuel delivery unit 22 through low-pressure fuel supply passage 24. Inlet valve 40 is opened by controller 48 when pumping plunger 34 is moving to expand the volume of pumping chamber 42, thereby drawing fuel into pumping chamber 42. Inlet valve 40 is subsequently closed by controller 48, thereby allowing fuel within pumping chamber 42 to be compressed when pumping plunger 34 is moving to decrease the volume of pumping chamber 42. When the pressure of fuel within pumping chamber 42 is sufficiently high, the fuel pressure causes outlet valve 44 to open and communicate the pressurized fuel to high-pressure fuel rail 46 where high-pressure fuel injectors 16 are able to receive the pressurized fuel and inject the fuel directly into the combustion chambers of internal combustion engine 12. Since high-pressure fuel delivery unit 22 is supplying fuel to high-pressure fuel injectors 16, a constant supply of fresh, relatively cool fuel is supplied from fuel tank 14 to high-pressure fuel delivery unit 22, thereby providing lubrication and cooling to high-pressure fuel delivery unit 22.

In operation, when only low-pressure fuel injectors 18 are used to supply fuel to the combustion chambers of internal combustion engine 12, low-pressure fuel delivery unit 20 draws fuel from fuel tank 14 and passes the fuel to high-pressure fuel delivery unit 22 through low-pressure fuel supply passage 24. The fuel supplied to high-pressure fuel delivery unit 22 passes through drive region 30 and exits high-pressure fuel delivery unit 22 through cooling passage 52 which feeds the fuel back to low-pressure fuel supply passage 24 at a point that is between low-pressure fuel delivery unit 20 and high-pressure fuel delivery unit 22, consequently, the fuel from drive region 30 is mixed with relatively cool fuel from fuel tank 14 in low-pressure fuel supply passage 24. Fuel is supplied to low-pressure fuel injectors 18 through low-pressure fuel injector supply passage 54 which draws fuel from low-pressure fuel supply passage 24 at a point that is between cooling passage 52 and high-pressure fuel delivery unit 22. Consequently, low-pressure fuel injector supply passage 54 receives a mix of fuel directly from fuel tank 14 and from drive region 30, thereby allowing fuel to flow indirectly from drive region 30 to low pressure fuel injectors 18. Also consequently, a portion of the fuel that is supplied to drive region 30 is received directly from fuel tank 14. In this way, drive region 30 is lubricated and cooled even when only low-pressure fuel injectors 18 are used to supply fuel to the combustion chambers of internal combustion engine 12 or when low-pressure fuel injectors 18 are used to supply fuel to the combustion chambers concurrently with high-pressure fuel injectors 16 providing a low rate of fuel to the combustion chambers of internal combustion engine 12.

While cooling passage 52 has been illustrated as feeding directly into low-pressure fuel supply passage 24, cooling passage 52 may feed directly into low-pressure fuel injector supply passage 54 or accumulator 58.

While this invention has been described in terms of preferred embodiments thereof, it is not intended to be so limited, but rather only to the extent set forth in the claims that follow.

We claim:

1. A fuel system for an internal combustion engine, said fuel system comprising:
   a low-pressure fuel delivery unit;
   a high-pressure fuel delivery unit which has a drive region and a delivery region which includes a pumping chamber such that said drive region supplies fuel to said delivery region and such that said delivery region supplies fuel to a high-pressure fuel injector, said high-pressure fuel delivery unit also having 1) an inlet which supplies fuel to said drive region without passing through said pumping chamber, 2) an inlet valve which selectively allows fuel to flow from said inlet to said pumping chamber, 3) a first outlet in fluid communication with said drive region, and 4) a second outlet which provides fluid communication from said delivery region to said high-pressure fuel injector;
   a low-pressure fuel supply passage which supplies fuel from said low-pressure fuel delivery unit to said inlet of said high-pressure fuel delivery unit;
   a cooling passage which receives fuel from said drive region of said high-pressure fuel delivery unit through said first outlet; and
   a low-pressure fuel injector supply passage which is in direct fluid communication with said low-pressure fuel supply passage and which supplies fuel to a low-pressure fuel injector from said cooling passage.

2. A fuel system as in claim 1 wherein said cooling passage supplies fuel from said drive region of said high-pressure fuel delivery unit directly to said low-pressure fuel supply passage at a first location between said low-pressure fuel delivery unit and said high-pressure fuel delivery unit.

3. A fuel system as in claim 2 wherein said low-pressure fuel injector supply passage receives fuel from said low-pressure fuel supply passage at a second location between said cooling passage and said high-pressure fuel delivery unit.

4. A fuel system as in claim 1 further comprising a means for damping pressure pulsations, said means for damping pressure pulsations being located in said low-pressure fuel injector supply passage.

5. A fuel system as in claim 4 wherein said means for damping pressure pulsations comprises an accumulator which provides an enlarged volume within said low-pressure fuel injector supply passage.

6. A fuel system as in claim 5 wherein said means for damping pressure pulsations further comprises a pulsation damper which is flexible and resilient in order to dampen pressure pulsations such that said pulsation damper is located within said accumulator.

7. A method of operating a fuel system, said fuel system having a low-pressure fuel delivery unit, a high-pressure fuel delivery unit having a drive region and a delivery region which includes a pumping chamber such that said drive region supplies fuel to said delivery region and such that said delivery region supplies fuel to a high-pressure fuel injector, said high-pressure fuel delivery unit also having 1) an inlet, 2) an inlet valve which selectively allows fuel to flow from said inlet to said pumping chamber, 3) a first outlet in fluid communication with said drive region, and 4) a second outlet which provides fluid communication from said delivery region to said high-pressure fuel injector, a low-pressure fuel supply passage, a cooling passage which receives fuel from said drive region of said high-pressure fuel delivery unit, and a low-pressure fuel injector supply passage in direct fluid communication with said low-pressure fuel supply passage; said method comprising:
   using said low-pressure fuel delivery unit to supply fuel to said drive region of said high-pressure fuel delivery unit through said low-pressure fuel supply passage and through said inlet without passing through said pumping chamber;
   using said cooling passage to supply fuel from said drive region of said high-pressure fuel delivery unit to said low-pressure fuel injector supply passage through said first outlet; and
   using said low-pressure fuel injector supply passage to supply fuel to a low-pressure fuel injector from said cooling passage.

8. A method as in claim 7 further comprising passing fuel from said cooling passage directly to said low-pressure fuel supply passage.

9. A method as in claim 7 further comprising passing fuel from said cooling passage to said low-pressure fuel injector supply passage through said low-pressure fuel supply passage.

\* \* \* \* \*